United States Patent [19]
Oka et al.

[11] Patent Number: 6,088,958
[45] Date of Patent: Jul. 18, 2000

[54] PROCESS FOR PRODUCING POTATO TUBERS

[75] Inventors: Ichiro Oka, Sashima-gun; Takahiro Ohno, Iwata-gun, both of Japan

[73] Assignee: Japan Tobacco, Inc., Tokyo, Japan

[21] Appl. No.: 09/077,498

[22] PCT Filed: Sep. 26, 1997

[86] PCT No.: PCT/JP97/03429

§ 371 Date: Sep. 28, 1998

§ 102(e) Date: Sep. 28, 1998

[87] PCT Pub. No.: WO98/14051

PCT Pub. Date: Apr. 9, 1998

[30] Foreign Application Priority Data

Sep. 30, 1996 [JP] Japan .................................. 8-259486

[51] Int. Cl.[7] .................................................. A01G 31/00
[52] U.S. Cl. ................................. 47/58.1; 47/62 R
[58] Field of Search ........................... 47/58.1, 59, 62 A, 47/62 N, 62 R

[56] References Cited

U.S. PATENT DOCUMENTS

| | | | |
|---|---|---|---|
| 4,329,812 | 5/1982 | Carlise | 47/59 |
| 4,860,490 | 8/1989 | Morris et al. | 47/59 X |
| 4,976,064 | 12/1990 | Julien | 47/59 X |
| 5,394,647 | 3/1995 | Blackford, Jr. | 47/62 |
| 5,498,541 | 3/1996 | Oka et al. | 47/58.1 X |
| 5,854,066 | 12/1998 | Oka | 47/58.1 X |
| 5,896,701 | 4/1999 | Schaerer | 47/59 X |

FOREIGN PATENT DOCUMENTS 0 167 638  1/1986  European Pat. Off. ........... 47/59

*Primary Examiner*—Michael J. Carone
*Assistant Examiner*—Jeffrey L. Gellner
*Attorney, Agent, or Firm*—Birch, Stewart, Kolasch & Birch, LLP

[57] ABSTRACT

A method for producing potato tubers by hydroponics, by which potato tubers free from lenticel hypertrophy may be produced is disclosed. The method for producing potato tubers according to the present invention is characterized in that a partition member through which roots of potatoes can pass while stolons of potatoes cannot pass is provided above nutrient solution, that the roots are at least partially immersed in the nutrient solution through the partition member, and that the stolons of potatoes are grown on the upper side of the partition member so as to form potato tubers.

8 Claims, 1 Drawing Sheet

PROCESS FOR PRODUCING POTATO TUBERS

This application is the national phase under 35 U.S.C. §371 of prior PCT International Application No. PCT/JP97/03429 which has an International filing date of Sep. 26, 1997 which designated the United States of America, the entire contents of which are hereby incorporated by reference.

TECHNICAL FIELD

The present invention relates to a method for producing potato tubers by hydroponics. More particularly, the present invention relates to a method for producing potato tubers used as seed potatoes highly suited for storing and cultivation, which are free from diseases.

BACKGROUND ART

Inventions relating to methods of producing seed potatoes using NFT (Nutrient Film Technique) are known and described in, for example, Japanese Laid-open Patent Application (Kokai) No. 5-284864.

In this method, the bottom of a bed for hydroponics is sloped, nutrient solution flows on the bottom of the bed from upstream to downstream such that the nutrient solution forms a thin layer, and potato plants are cultivated with the nutrient solution. This method is nothing more than the the method widely used for cultivating other crops such as tomatoes as applied to cultivation of potatoes. The open conventional method will now be described in more detail. The open upper portion of a cultivation bed is covered with a light-intercepting cover having planting holes. A support made of polyurethane foam is mounted on the stem of each potato plant with 4–14 leaves, at the site above the 2nd to 5th leaf from the root, which plant was grown by tissue culture or the like, and the support is inserted in the planting hole in the cover. The potato plants are cultivated in this state without any member between the flow of the nutrient solution and the stolons so as to form seed potatoes.

The conventional method has a problem that the potato tubers formed at the tips of the stolons are at least partially immersed in the nutrient solution because no members exist between the flow of the nutrient solution and the stolons. In the surface of the region of a potato tuber, which region contacts the nutrient solution, lenticel hypertrophy is generated. Potato tubers with lenticel hypertrophy tend to lose their water and are likely to rot due to infection with pathogens during storage, so that the storage qualities are extremely poor. Further, outer appearance of the potato tubers with lenticel hypertrophy is also very bad.

Japanese Laid-open Patent Application (Kokai) No. 5-284864 states that immersion of potato tubers in the nutrient solution is prevented by providing shallow grooves in the bottom of the container, and FIG. 6 shows the state that the potato tubers are formed above the grooves. However, it is impossible that all potato tubers be formed above the grooves as shown in this drawing, but most of the tubers are formed such that they contact the nutrient solution. FIG. 5 also shows the state that a number of tubers are formed in the air, apart from the nutrient solution. However, although some tubers existed in the air in the beginning of the growth of the tubers, most of these tubers come down with the growth and increase in the weight of the tubers and with the aging of the stolons to contact the bottom of the bed and there were substantially no tubers that existed in the air except for small tubers.

The above-described conventional method has also a problem that the number of produced seed potatoes is small because there is no means for stimulating the stolons so as to accelerate formation of tubers.

The above-described conventional method still has a problem that the size of the produced potatoes vary widely because tuberization of the stolons largely varies, that is, the timing of tuber initiation differ from one stolon to another so that the tubers which started to grow at an early stage grow to unnecessary large sizes, and the tubers which started to grow at a late stage do not grow enough.

DISCLOSURE OF THE INVENTION

Accordingly, an object of the present invention is to provide a method for producing potato tubers by hydroponics, by which potato tubers free from lenticel hypertrophy may be produced. Another object of the present invention is to provide a method for producing potato tubers by hydroponics, by which a number of tubers used as seed potatoes are produced, and by which the size distribution of the tubers is small.

The present inventors intensively studied to discover that growth of lenticel hypertrophy due to contact of the formed tubers with the nutrient solution may be prevented by providing a partition member above the nutrient solution, through which roots of potatoes can pass while stolons of potatoes cannot pass, at least partially immersing the roots in the nutrient solution through the partition member, and by growing the stolons of potatoes on the upper side of the partition member so as to form potato tubers, thereby completing the present invention.

That is, the present invention provides a method for producing potato tubers by hydroponics, characterized in that a partition member through which roots of potatoes can pass while stolons of potatoes cannot pass is provided above the nutrient solution, that the roots are at least partially immersed in the nutrient solution through the partition member, and that the stolons of potatoes are grown on the upper side of the partition member so as to form potato tubers.

The present invention also provides a method for producing potato tubers according to the above-described method of the present invention, wherein physical stimulation such as application of pressure or shower to the stolons which are growing on the upper side of the partition member.

By the method for producing potato tubers according to the present invention, since the formed tubers do not contact the nutrient solution, lenticel hypertrophy do not grow. Therefore, the loss of water during storage is small and rotting of potatoes due to infection with pathogens scarcely occurs, so that the potatoes have good storage qualities. Further, the number of tubers produced by the method of the present invention is large and the harvesting of the tubers is easy. Still further, the tubers produced by the method of the present invention are free from diseases and size distribution thereof is small, so that they are highly useful as seed potatoes suitable for cultivation and storage. Needless to say, the tubers produced by the method of the present invention are also good for table potatoes.

BEST MODE FOR CARRYING OUT THE INVENTION

Figure 1:
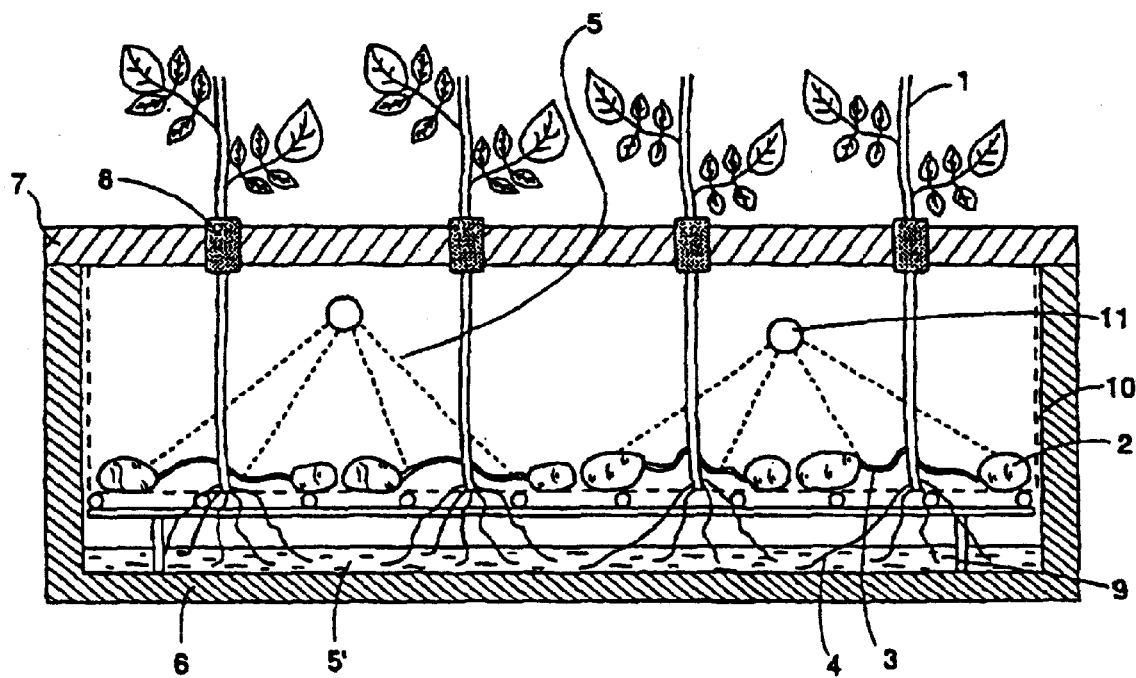
FIG. 1 is a schematic view for explaining the method according to an embodiment of the present invention.

The apparatus for hydroponics used in the method of the present invention is not restricted and any type of apparatuses for hydroponics may be employed. Preferred hydroponics apparatuses include NFT (Nutrient Film Technique). NFT are characterized in that a flow of the nutrient solution for hydroponics is formed on the horizontal or slant cultivation bed. More particularly, a bed having a depth of 10–50 cm, of which upper portion is open, may preferably be employed as a cultivation bed. The bed may be made of any material suited for hydroponics, which does not make the nutrient solution pass through. The bed may be assembled with plates of woods or polystyrene foam, and the inside of the bed may be covered with a plastic sheet so as to prevent the nutrient solution from leaking out. The depth of the nutrient solution in the above-mentioned flow is usually 10 0.5–3 cm.

The size of the bed may vary depending on the size of greenhouse, working method and the like, and usually 0.5–2 m in width and 0.5–50 m in length.

On the upper portion of the bed, a planting plate having planting holes with a diameter of about 1–3 cm therein is placed. Although the planting plate may be light-intercepting, the planting plate may preferably be made of a light-transmitting material such as polystyrene foam in order to make the inside of the container dark from the tuber-initiation stage in order to synchronously induce tuberization on stolons. In cases where a light-transmitting planting plate is employed, the inside of the container may be made dark by placing a light-intercepting plastic sheet or a plate thereon. Although the planting plate may be a large one having planting holes arranged in a plurality of rows, it is convenient for the planting operation and the like to use planting plates each of which has one row of planting holes, a part of the side of the planting holes being open.

In appropriate sites in the bed, at least one inlet and at least one outlet of the nutrient solution are provided. The inlet is piped such that the nutrient solution transferred from a nutrient solution tank by a pump enters the bed. The nutrient solution in the bed is discharged through the outlet. Although the discharged nutrient solution may be discarded, the discharged nutrient solution is usually returned to the nutrient solution tank or to the bed so as to recycle the nutrient solution. Although the bed may be placed horizontally, the bed is preferably sloped to a gradient of 1/50 to 1/500.

The nutrient solution used in the method of the present invention is not restricted and may be any one with which potatoes can be cultivated. A preferred example of the composition of the nutrient solution is concretely described in the examples described below.

As the potato plants used in the method of the present invention, although usually available tubers and plantlets propagated by herbaceous cutting of sprouts may be employed, it is preferred to use plantlets propagated by tissue culture or the like, which are free from viruses and diseases. Nodal-propagated plants obtained by cultivating the plantlets propagated by tissue culture or the like in a greenhouse or the like so that they are not infected with pathogens may also be used.

The length of the stem of the plant may preferably be 5–40 cm, more preferably 15–30 cm.

In cases where plantlets grown by tissue culture are used, although the plantlets may be directly planted in the cultivation bed described below, it is preferred to plant the plantlets in a temporal bed other than the cultivation bed so as to acclimatize the plantlets and to grow the plants to the size appropriate for planting.

The partition member used in the method of the present invention, through which roots of potatoes can pass while stolons of potatoes cannot pass may be, for example, a net or woven fabric, but it is not restricted thereto. The partition member may preferably be a plastic net with a 40–50 mesh.

The partition member is placed at a position higher than the upper surface of the nutrient solution by 0.5 to 5 cm, more preferably by 2 to 3 cm, on or after the tuber-forming stage. Since the depth of the nutrient solution on or after the tuber-forming stage is usually 0.5 to 3 cm, the position of the partition member may preferably be 1 to 8 cm (more preferably 3 to 6 cm) from the bottom of the bed.

There are a number of methods for setting the partition member. By placing the partition member on a platform made of wire net (the size or diameter of the mesh is preferably about 1 to 5 cm), the partition member may be easily set and contact of the tubers with the nutrient solution due to coming down of the tubers after growth of the tubers can be prevented. By folding the end portions of the partition member in upper direction along the side wall of the bed such that the peripheral portions of the partition member becomes higher than the middle part thereof, it can be prevented that the stolons extend beyond the edge of the partition member to enter the nutrient solution.

In the method of the present invention, potato plants may be planted in the above-mentioned NFT hydroponics apparatus by, for example, the method as follows. A part of the stem of the plant grown as described above is covered with an elastic support made of polyurethane foam or the like and the support is inserted into the planting hole formed in the planting plate of the NFT hydroponics apparatus, thereby planting the potato plant.

The position at which the support for planting is mounted may preferably be, for example, the portion of the stem below the second developing leaf from the top of the potato plant. By planting the potato plant such that the base of the potato plant contacts the above-mentioned partition member, incomplete rooting may be prevented. To prevent incomplete rooting due to drying of the roots, it is preferred to temporarily make the upper surface of the nutrient solution equal to or higher than the level of the upper side of the partition member. After the roots grew sufficiently into the nutrient solution under the partition member, the level of the nutrient solution is lowered to a position below the partition member. In this case, the level of the nutrient solution is lowered to a position at which the tubers do not contact the nutrient solution even when the partition member comes down due to the increased weight of the tubers. Usually, the level of the nutrient solution is lowered to a position 0.5 to 5 cm lower than the partition member. The level of the nutrient solution may be lowered at one time or gradually. To avoid enlargement of lenticels on the surface by the contact of the tubers with the nutrient solution, it is preferred to lower the level of the nutrient solution to a position under the partition member before the largest tuber grows to a size of about 3 cm.

As mentioned above, the partition member used in the method of the present invention is one through which roots of potatoes can pass while stolons of potatoes cannot pass. Therefore, the roots thinner than the stolons grow through the partition member so as to reach the nutrient solution below the partition member and the potato plants grow by absorbing nutrition. Since the stolons thicker than the roots cannot grow through the partition member, the stolons grow on the upper side of the partition member.

In a preferred mode of the present invention, physical stimulation is given to the stolons growing on the upper side of the partition member so as to accelerate the tuberization of the stolons and to increase the number of tubers produced. Examples of the method for giving physical stimulation to the stolons include the method in which pressure is applied to the stolons and the method in which shower is given to the stolons. These methods may be employed in combination so as to give physical stimulations to the stolons.

In the method of the present invention, by giving physical stimulation to the stolons, tuberization of the stolons synchronously starts, so that distribution of the growth among the stolons, and in turn, the size distribution of the produced tubers, may be decreased.

A preferred method for applying pressure to the stolons is to cover the partition member with weights such as bags made of plastic or cloth, which contain water, sand or the like, or gravel. Although the weight per one weight is not restricted, in cases where bags containing water or sand are used, the weight of one sack may preferably be about 50 to 500 g, and in cases where gravel is used, the size of one small stone may preferably be 5 to 20 mm (or the weight of one small stone may preferably be about 1 to 10 g). The timing of covering the upper side of the partition membrane with the weights such as bags made of plastic or cloth, which contain water, sand or the like, or gravel may be either at the time of planting or after the stolons grew to the upper side of the partition member. In cases where the partition member is covered with the weights at the time of the planting, the stolons grow under these bags or gravel, that is, grow between these sacks or gravel and the partition member, so that pressure is applied to the stolons. In cases where pressure is applied after the stolons grew, since most of the stolons grow along the partition member, the above-mentioned bags or gravel may be placed on the stolons. In this case, it is preferred to apply pressure before tuberization of the stolons, that is, before the start of tuberization.

Shower may be applied to the stolons usually by pipes or plastic tubes having a number of holes in the lower portions thereof below the planting plate. The pipes or plastic tubes are connected to an inlet of the nutrient solution and the holes are opened in the downward and/or obliquely downward direction, so that the supplied nutrient solution hits the stolons and bases of the potato plants.

The diameter of the holes may preferably be about 1 to 3 mm (more preferably 1.5 to 2 mm) and the interval between the adjacent holes on a row may preferably be 1 to 5 cm. One to four rows of such holes may preferably be formed per one pipe or tube. Such pipes or tubes may be placed at a position higher than the stolons preferably by about 10 to 30 cm at an interval of preferably about 10 to 50 cm, so that the nutrient solution is uniformly sprinkled in the container (this method for supplying nutrient solution is hereinafter also referred to as "upper supplying method").

Although the nutrient solution may be supplied from an upper position during the entire cultivation period from the planting to the harvesting, it is preferably supplied only between the time after the stolons grown and before the beginning of the tuber formation and the time of harvesting, more preferably between the time immediately before the tuber formation and the time of beginning of the growth of the tubers.

Although the case where the NFT hydroponics apparatus is used has been described, the method of the present invention is not restricted to this case, but any methods in which a partition member through which roots of potatoes can pass while stolons of potatoes cannot pass is provided above the nutrient solution, the roots are at least partially immersed in the nutrient solution through the partition member, and in which the stolons of potatoes are grown on the upper side of partition member so as to form potato tubers, are within the scope of the present invention.

EXAMPLES

The present invention will now be described more concretely by way of examples thereof. It should be noted, however, the examples below are presented for the illustration purpose only and should not be interpreted in any restrictive way.

Example 1

(1) Growing Disease-free Potato Plantlets Used as Plant Materials

Virus-free potato plantlets (variety: Danshakimo (Irish Cobbler), obtained by growing the plantlets stored in Japan Tobacco Inc., Plant Breeding and Genetics Research Laboratory) cultured in test tubes (diameter: 2.5 cm, length: 12 cm) by a known method were used as the plant materials. The virus-free plantlets cultured in the test tubes (hereinafter also referred as "cultured plantlets" for short) had a length of about 5 to 7 cm and had about 7 leaves.

(2) Production of Tubers in NFT Hydroponics Apparatus

In an NET hydroponics apparatus prepared by modifying commercial NFT hydroponics apparatus "Home Hyponica 302" (commercially available from KYOWA CO., LTD.; size of container: about 67×66 cm, height: about 21 cm; the depth of the cultivation tray including the planting plate: about 7 cm), 24 plantlets mentioned above were planted (6 plantlets×4 rows, about 10×12 cm intervals), and cultivation was carried out in a temperature-controlled greenhouse (the temperature in the greenhouse was about 20 to 25° C. during daytime and about 15 to 18° C. during nighttime, the length of the daytime is the same as that of the natural daytime). Tubers were harvested on the 112th day from the planting.

(3) Modification of Apparatus so as to Use the Apparatus in the Method of the Invention and Method for Producing Tubers by the Method of the Invention A platform made of wire net having a height of about 3 cm was placed on the bottom of the cultivation tray of the original apparatus and a plastic 40 mesh net which passes the roots of the potatoes but does not pass the stolons (hereinafter also referred to simply as "net") as the partition member in the present invention was laid on the platform. To prevent the stolons from extending to the nutrient solution over the edges of the net, the end portions of the net were folded along the side wall of the cultivation tray such that the peripheral portions of the net are higher than the middle part of the net.

The region of the stem of each plantlet, which region was under the second or third developing leaf from the top of the plantlet, was wrapped with a polyurethane foam cube and this region was inserted into the planting hole in the plate made of polystyrene foam. Thus, each of the plantlets was planted such that two or three leaves on the upper part thereof were located above the planting plate and the roots and the base of the plantlet were immersed in the nutrient solution.

To prevent incomplete rooting of the plantlets due to drying of the roots, the level of the nutrient solution was higher than the net by several millimeters when the planting was carried out, and the level of the nutrient solution was gradually lowered after the roots sufficiently grew into the nutrient solution under the net. From the second week after the planting, the level of the nutrient solution was about 1 cm from the bottom of the cultivation tray.

In the original apparatus, the distance between the lower surface of the planting plate to the bottom of the cultivation tray was only about 7 cm, so that the space is too small to produce potato tubers. Therefore, on the 22nd day after the planting when the plant grew to a height of about 15 to 20 cm from the upper surface of the planting plate, polystyrene foam plates with a height of about 10 cm were added to the side walls of the apparatus and the planting plate was placed on the newly added plates so as to expand the space between the planting plate and the bottom of the cultivation tray (the space is hereinafter also referred to as "tuber-forming space") Further, the region of the stem under the second or third developing leaf from the top of the plant was again wrapped with a polyurethane foam cube and this region was inserted into the planting hole in the planting plate which was raised as mentioned above, thereby changing the position supported of the plant. On the 29th day after the planting, the upper surface of the planting plate and the side surfaces of the cultivation container were covered with an opaque plastic sheet so as to darken the tuber-forming space. Needless to say, the stems and the leaves of the plants above the planting plate were outside the sheet. Since polystyrene foam plates used as the planting plate and the side walls added on the tray allows transmission of light, the tuber-forming space was in light condition unless it is covered with an opaque plastic sheet.

As the nutrient solution for hydroponics, a solution prepared by dissolving a commercial fertilizer for horticulture "Fine Powder Hyponex 6.5-6-19" (commercially available from HYPONECS CORPORATION) in 1000 volumes of water was placed in the cultivation apparatus at the time of the planting, and thereafter, the nutrient solution or water was added so as to keep an electric conductivity of 1.5 to 2.5 mS/cm. The pH of the nutrient solution was adjusted to 5 to 7 every several days. The depth of the nutrient solution in the cultivation tray was about 4 cm at the time of the planting and the level of the nutrient solution was gradually lowered after the roots grew. After the change in the position supported, the depth of the nutrient solution was about 1 cm.

(4) Production of Seed Potatoes with Conventional NFT Hydroponics Apparatus

The original apparatus was modified in the same manner as the above-described apparatus used in the method of the present invention except that the platform made of wire net and the net were not placed. The temperature in the greenhouse, the plantlets used, the method for planting the plantlets, the nutrient solution for hydroponics, the adjustment of the level of the nutrient solution, the method for harvesting the tubers, and the like were the same as the above-described method according to the present invention.

The surfaces of the tubers produced and harvested as described above were cured in a room at about 10° C. for 4 days after the harvesting. The number and weights of the tubers were measured for each class of weight. The results are shown in Table 1.

TABLE 1

| | Yield of Example 1 | | | | | | |
| --- | --- | --- | --- | --- | --- | --- | --- |
| | Number of Tubers per Plant Size of Tuber | | | | | | Weight of Tubers per Plant |
| Group | 100 g or more | 100–50 g | 50–10 g | 10–3 g | 3–0.1 g | Total | g/plant |
| The Invention | 0.3 | 1.0 | 2.8 | 1.1 | 6.1 | 11.2 | 197 |
| Conventional Method | 0.3 | 1.4 | 4.8 | 2.7 | 4.0 | 13.2 | 282 |

Note: "Weight of Tubers per Plant" is the total of the weight of tubers of not less than 3 g.

As is apparent from Table 1, in the group of the present invention, although the number of tubers was a little smaller than in the group of the conventional method, lenticel hypertrophy in the skin was scarcely observed because the tubers were produced on the upper side of the net without contacting the nutrient solution, so that tubers with good appearance were obtained. On the other hand, in the group of the conventional method, since most of the tubers were produced contacting the bottom of the cultivation tray, generation of lenticel hypertrophy in the surface of the lower portions of the tubers was severe, which portions were immersed in the nutrient solution.

Further, since the tubers were produced in such a state that parts of the tubers were immersed in the nutrient solution in the group of the conventional method, and so the portions are wetted, the surface of the tubers must be dried by placing the tubers after harvesting in an airy room for several days before storing the tubers. In contrast, it is substantially unnecessary to dry the tubers produced by the method of the present invention before storage.

Still further, in the group of the conventional method, since the tubers were produced on the bottom of the tray together with the roots, some of the tubers smaller than about 20 g were hidden by the roots and were difficult to find. To find such tubers, it was necessary to look for the tubers by pushing aside the roots. Moreover, when the tubers were harvested, roots were attached to the tubers so that it was necessary to wash the tubers with water after harvesting. These procedures not only require much labor and equipment, but also make small injuries in the surface of the tubers during harvesting or washing, which causes infection of pathogens and, in turn, rotting of the tubers. In contrast, in the group of the present invention, the roots grew to the position below the net while the tubers were produced on the net, even small tubers were not hidden by the roots, so that harvesting the tubers was easy and it was not necessary to wash off the attached roots.

To examine the storage qualities of the produced tubers in the group of the present invention and in the group of the conventional method, the harvested tubers were temporality stored in a room at 10° C. for 12 days and then stored at a low temperature of about 4° C. for additional 175 days. The tubers which were judged not suitable as seed potatoes due to rotting, drying or the like were eliminated after the temporary storage and after the cold storage, and the number and weights of the remaining tubers were measured so as to examine the storage qualities. The results are shown in Table 2.

TABLE 2

| | Group | Ratio of Number or Weight of Tubers* Size of Tubers | | |
| --- | --- | --- | --- | --- |
| | | 50 g or more | 50–20 g | 20–10 g |
| Number of Tubers | The Invention | 100 | 98 | 93 |
| | Conventional Method | 90 | 84 | 85 |
| Weight of Tubers | The Invention | 95 | 91 | 86 |
| | Conventional Method | 87 | 77 | 74 |

*Ratio of Number or Weight of Tubers:
(Ratio of Number of Tubers) = (Number of Tubers after Storage)/Number of Tubers before Storage) × 100
(Ratio of Weight of Tubers) = (Weight of Tubers after Storage)/(Weight of Tubers before Storage) × 100

As is apparent from Table 2, in the group of the present invention, the tubers discarded because of rotting or drying during storage were much fewer than in the group of the conventional method, so that the tubers in the group of the present invention were excellent in storage qualities. A number of tubers in the group of the conventional method rotted from the sites where lenticel hypertrophy was generated during the temporary storage.

Since rotting of tubers is infected to other tubers, the rotted tubers must be carefully removed, so that much labor is required for the selection. In this respect too, the tubers produced in the group of the present invention were superior to those produced in the group of the conventional method. Moreover, the degree of shrinkage of the tubers after storage was smaller in the tubers produced in the group of the present invention than that of the tubers produced in the group of the conventional method. This means that tubers produced by the method of the present invention had high physiological activities and had high production abilities as seed potatoes.

Example 2

Virus-free plantlets of potato variety May Queen (obtained by growing the plantlets stored in Japan Tobacco Inc., Plant Breeding and Genetics Research Laboratory) cultured in test tubes as in Example 1 were cultivated by hydroponics in a plastic container (length: about 30 cm; width: about 20 cm; height: about 5 cm) containing a culture medium, thereby growing plants for planting. The base of each cultured plantlet was wrapped with a polyurethane foam cube and each plantlet was transplanted in a planting hole in a polystyrene foam plate floated on the nutrient solution in the plastic container. As the nutrient solution for hydroponics, a solution prepared by dissolving a commercial fertilizer for horticulture "Liquid Hyponex 5-10-5" (commercially available from HYPONECS CORPORATION) in 1000 volumes of water was used. The platelets were cultivated in a temperature-controlled greenhouse (the conditions were the same as in Example 1) for 13 days. On the 13th day of the cultivation, the plants had lengths of about 15 to 20 cm and about 12 to 14 leaves per plant.

As in Example 1, platform made of wire net with a height of 3 cm was placed on the bottom of the cultivation tray of a commercial hydroponics apparatus "Home Hyponica 302" and nets in the form of a box, whose peripheral portions were made high in order to prevent the stolons from extending to the nutrient solution, were placed on the platform. Two nets each of which corresponds to the size half of the bottom of the tray were provided and were placed adjacently in one apparatus. Further, as in Example 1, polystyrene foam plates with a height of about 10 cm were added to the side walls of the cultivation tray, thereby expanding the tuber-forming space.

A planting plate as used in Example 1 was provided. The region of the stem under the second or third developing leaf from the top of each plant was wrapped with a polyurethane foam cube and this region was inserted into the planting hole in the planting plate, thereby planting the plants such that two or three developing leaves at the top of each plant were located above the planting plate. One of the nets was covered with 10 plastic bags each containing about 100 ml water so as to apply pressure to the bases of the plantlets planted on the net as well as to the stolons which would grow from the nodes near the bases of the plants (pressed group). On the another net, no bags containing water were placed (non-pressed group). Nine plants were planted in each of the nets. As the nutrient solution, a solution prepared by dissolving a commercial fertilizer for horticulture "Fine Powder Hyponex 6.5-6-19" was used. The electric conductivity of the nutrient solution was controlled to 1.5 to 2.0 mS/cm and the pH thereof was controlled to 5–7. Cultivation was carried out in a temperature-controlled greenhouse (the conditions were the same as in Example 1).

On the 14th day from the planting, the region of the stem under the second or third developing leaf from the top of each plant was wrapped with a polyurethane foam cube and this region was inserted into the planting hole in the planting plate, thereby changing the position supported such that more nodes are located under the planting plate. In the pressed group, the stem was placed under the plastic bags so that the weight of the water bags is applied to more stolons than at the time of planting. The planting plate and the side of the cultivation container were covered with an opaque plastic sheet to darken the tuber-forming space. The level of the nutrient solution was adjusted as in Example 1.

Tubers were harvested on the 99th day from the planting. The results are shown in Table 3.

controlled greenhouse. Three days after the planting, the upper surface of the planting plate and the side walls of each cultivation apparatus were covered with an opaque plastic sheet to darken the inside of the container. The tubers were harvested on the 98th day from the planting.

The nutrient solution basically contained 950 g of Ca$(NO_3)_2.4H_2O$, 800 g of $KNO_3$, 500 g of $MgSO_4.7H_2O$, 155 g of $NH_4H_2PO_4$ and minor elements (iron 3 ppm, boron 0.5 ppm, manganese 0.5 ppm, zinc 0.05 ppm, copper 0.02 ppm, and molybdenum 0.01 ppm) per 1000 liters of the nutrient solution. The electric conductivity at the time of planting was adjusted to about 1.5 mS/cm, that thereafter and before flowering was adjusted to about 1.5 to 2 mS/cm and that after flowering was adjusted to about 3 to 4 mS/cm. The pH was controlled to about 5 to 7.

Modifications for preparing the apparatuses (a) and (b) were as follows:

Apparatus (a): An apparatus used for carrying out a conventional method (NFT hydroponics apparatus, herein-

TABLE 3

Yield of Example 2

| Group | Number of Tubers per Plant Size of Tuber | | | | | | Weight of Tubers per Plant |
|---|---|---|---|---|---|---|---|
| | 100 g or more | 100–50 g | 50–10 g | 10–3 g | 3–0.1 g | Total | g/plant |
| Non-Pressed | 0.1 | 0.6 | 5.7 | 2.0 | 2.0 | 10.4 | 205 |
| Pressed | 0.0 | 0.3 | 12.6 | 5.3 | 6.2 | 24.4 | 321 |

Note: "Weight of Tubers per Plant" is the total of the weight of tubers of not less than 3 g.

In the pressed group, the size distribution of the tubers is smaller than in the non-pressed group. The number of the produced tubers in the pressed group was more than twice that in the non-pressed group and the number of tubers with weights of 50–10 g especially suited as seed potatoes produced in the pressed group was more than that produced in the non-pressed group. Thus, it was proved that application of pressure to the stolons has a great effect to increase the number of tubers.

In both groups, since nets were set as the partition member, lenticel hypertrophy was scarcely observed as in Example 1, so that the tubers had good storage qualities.

Example 3

As in Example 2, virus-free plantlets of variety May Queen (having lengths of 5 to 7 cm and 4 to 6 leaves) were cultivated by hydroponics in a plastic container (length: about 54 cm, width: about 35 cm, height: about 15 cm) containing nutrient solution, thereby growing plants for planting. The cultivation method was the same as in Example 2 except for the size of the container. However, for obtaining the plants for planting, plantlets were cultivated for 22 days, and the plants on the 22nd day had lengths of about 25 to 30 cm and had about 9 to 11 leaves.

These plants were planted in the apparatuses (a) and (b) prepared by modifying the commercial hydroponics apparatus "Home Hyponica 302" in the manner described below, in the number of 24 plants (6 plants×4 rows, about 10×12 cm intervals) per apparatus, and cultivated in a temperature-after also referred to as "conventional method group"). Polystyrene foam plates with a height of 10 cm were added to the side walls of the cultivation tray of the original apparatus so as to expand the tuber-forming space, and a polystyrene foam plate (planting plate) in which planting holes (diameter: about 1.5 cm, 6 holes×4 rows=24 holes, about 10×12 cm intervals) was placed thereon.

Apparatus (b): An apparatus used for carrying out the method of the present invention (A net was set. Stolons were physically stimulated by giving shower thereto. Hereinafter also referred to as "shower group")

The apparatus (b) will now be described referring to FIG. 1 which schematically shows the apparatus (b). In FIG. 1, reference numeral 1 denotes potato plants, 2 denotes tubers, 3 denotes stolons, 4 denotes roots, 5 denotes the nutrient solution, 5' denotes the pass of the nutrient solution, 6 denotes the container, 7 denotes the planting plate, 8 denotes the polyurethane foam cubes for supporting the cultured plants 1 in the hole formed in the planting plate 7, 9 denotes a platform for placing a net 10 thereon, 10 denotes the net, and 11 denotes a pipe.

Polystyrene foam plates (not shown in FIG. 1) with a height of about 15 cm were added to the side walls of the cultivation container 6 of the original apparatus. Two pipes 11 made of polyvinyl chloride were attached in parallel below the planting plate 7 at a position lower than the lower surface of the planting plate by about 3 cm. The distance between the pipe 11 and the side wall of the container 6 was about 15 cm (the distance between the two pipes 11 was about 30 cm). Each pipe 11 had 4 rows of holes with a diameter of about 1.5 mm formed at intervals of about 5 cm and each pipe 11 was set such that the holes faces downwardly. Each of the two pipes 11 was connected to a nutrient solution-supplying pipe (not shown). As in Example 1, a platform 9 made of wire net with a height of about 3 cm was placed on the bottom of the cultivation tray and a 40 mesh net 10 was laid on the platform 9.

In the thus constructed apparatus (b), the nutrient solution 5 was supplied from an upper portion in the form of shower so as to stimulate the stolons 3 growing on the net 10.

Tubers 2 were harvested on the 98th day from the planting. The results are shown in Table 4.

Example 4

As in Example 3, virus-free plantlets of variety May Queen were grown to obtain plants for planting.

These plants were planted in the apparatus (a) (conventional method group) and the apparatus (b) (shower group) as used in Example 3.

To compare the plant materials, two apparatuses for "net+upper supplying method" were prepared. In one of these apparatuses, tubers with sprouts of about 15 cm length produced by hydroponics were planted in place of the plants (shower group (tuber)). On the other hand, virus-free plantlets were planted in the soil sterilized with steam, which was contained in a wooden box (about 67×66 cm, height: about

TABLE 4

Yield of Example 3

| Group | 100 g or more | 100–50 g | 50–10 g | 10–3 g | 3–0.1 g | Total | 100–10 g | Weight of Tubers per Plant g/plant |
|---|---|---|---|---|---|---|---|---|
| Shower | 0.0 | 1.8 | 5.5 | 2.4 | 1.6 | 11.3 | 7.3 | 280 |
| Conventional Method | 0.3 | 1.3 | 4.2 | 3.8 | 4.7 | 14.3 | 5.5 | 239 |

Note: "Weight of Tubers per Plant" is the total of the weight of tubers of not less than 3 g.

The size distribution of the tubers in the shower group according to the present invention was smaller and the number of the tubers with weights of 100 to 10 g was more than those produced in the conventional method group. Lenticel hypertrophy was scarcely observed in the skins of the harvested tubers, so that tubers with good appearance and good storage qualities were obtained. The starch content of the harvested tubers was 10.2% which was considerably higher than the starch content of the tubers produced in the conventional method group, which was 8.0%. Since tubers having such a high starch content have dense components therein so that they have excellent storage qualities and have high vigor when used as seed potatoes.

Moreover, in the shower group according to the method of the present invention, stolons grew very long and thick. It was proved that the physical stimulation provided by hitting the stolons with the nutrient solution greatly accelerate the growth of the stolons.

21 cm) having the same size as "Home Hyponica 302", to compare the hydroponics and the soil culture generally employed for producing seed potatoes. Twenty plants or tubers were planted per container.

As the nutrient solution, a solution prepared by dissolving a commercial fertilizer for horticulture "Fine Powder Hyponex 6.5-6-19" in 1000 volumes of water, to which nitrogen, calcium and magnesium were added to a concentration of 1 mmol/l each, and to which iron (60 pmol/l), manganese (19 pmol/l) and boron (3.7 μmol/l) were added, was used. Cultivation was carried out in a temperature-controlled greenhouse. On the 21st day from the planting, the tuber-forming space was darkened, and tubers were harvested on the 105th day from the planting.

The results are shown in Table 5.

TABLE 5

Yield of Example 4

| Group | 100 g or more | 100–50 g | 50–10 g | 10–3 g | 3–1 g | Total | Weight of Tubers per Plant g/plant |
|---|---|---|---|---|---|---|---|
| Shower | 0.0 | 0.1 | 4.8 | 5.6 | 2.0 | 12.3 | 144 |
| Shower (Tuber) | 0.2 | 1.5 | 3.8 | 1.1 | 0.6 | 7.1 | 231 |
| Conventional Method | 0.2 | 0.8 | 1.8 | 0.6 | 0.3 | 3.5 | 126 |
| Soil Culture | 0.2 | 0.8 | 1.5 | 0.4 | 0.4 | 3.1 | 120 |

Note: "Weight of Tubers per Plant" is the total of the weight of tubers of not less than 3 g.

Similar to the results of the Examples described above, in the shower group, the size distribution of the tubers was smaller and the number of produced tubers was greater than those of the tubers obtained in the conventional me-hod group and in the soil culture group.

In the case where tubers were used as the plant materials, although the number of large tubers having weights of not less than 50 g was great and the tuber weight per one plant was large, the number of tubers was smaller than in the case where plants were used.

Comparing the hydroponics and the soil culture, there were no differences in the number and weight of the produced tubers between the conventional hydroponics NFT method and the soil culture. However, by the method of the present invention, the number of produced tubers was considerably larger and the weight was greater.

Example 5

Tubers of variety May Queen produced by the method as in Example 2 according to the present invention were cultivated in the field and the suitability for cultivation as seed potatoes was examined. For comparison, commercial seed potatoes were used. The tubers produced by the method according to the present invention were planted as they are and the commercial seed potatoes were planted after cutting each potato into half or quarter. The seed potatoes were planted in the middle of February and the tubers were harvested in the middle of June. The number of seed potatoes planted per plot was 10 and the experiment was conducted with 2 replications.

The results of the yield are shown in Table 6.

seed potatoes. Although the yield when the tubers of 10–20 g were used as the seed potatoes was smaller, and the sprouting time and the flowering time was about 5 days later than in the cases where the commercially available tubers were used, all of the tested tubers sprouted, so that they may be used for some uses, for example, for producing seed potatoes.

Average weight of commercial seed potatoes is about 100 g and potato farmers plant the purchased seed potatoes after cutting them into half to quarter. Cutting of the potatoes requires much labor. Further, if a seed potato infected with a disease is contained, the disease may be infected to other potatoes during the cutting operation. In contrast, most of the tubers produced by the method of the present invention have sizes which are not necessary to be cut, and whole potatoes may be planted as they are, which is very advantageous.

No plant from the tubers produced by the method of the present invention were infected with viruses.

What is claimed is:

1. A method for producing potato tubers by hydroponics, characterized in that a partition member through which roots of potatoes can pass while stolons of potatoes cannot pass is provided above nutrient solution, that said roots are at least partially immersed in said nutrient solution through said partition member, and that said stolons of potatoes are grown on upper side of said partition member so as to form potato tubers.

2. The method according to claim 1, wherein said partition member is a net with 40–50 mesh.

TABLE 6

| Size of Seed Potatoes | | Number of Tubers per Plant (tubers/plant) | Yield per 10 Ares (kg/10a) | | | | | |
|---|---|---|---|---|---|---|---|---|
| Size | Average Weight (g/potato) | | Size of Tubers* | | | | | |
| | | | LL | L | M | S | SS | Total |
| Tubers of the Invention | | | | | | | | |
| 100–50 g | 58.2 | 12.7 | 532 | 1,219 | 1,653 | 1,312 | 508 | 5,225 |
| 50–20 g | 30.9 | 11.1 | 1,264 | 1,278 | 1,195 | 1,129 | 428 | 5,294 |
| 20–10 g | 14.5 | 8.0 | 718 | 1,319 | 1,026 | 804 | 203 | 4,069 |
| 10–5 g | 6.9 | 7.4 | 816 | 1,042 | 860 | 628 | 284 | 3,630 |
| 5–3 g | 3.3 | 5.3 | 583 | 1,027 | 569 | 439 | 155 | 2,773 |
| 3–1 g | 1.5 | 5.6 | 172 | 861 | 577 | 509 | 244 | 2,364 |
| Commercial Seed Potato | | | | | | | | |
| Half Cut | 45.2 | 11.4 | 466 | 1,776 | 1,251 | 1,122 | 434 | 5,049 |
| Quarter Cut | 26.9 | 9.2 | 1,449 | 1,726 | 949 | 880 | 217 | 5,221 |

*Size of Tubers LL: 180 g or more
L: 120–180 g
M: 80–120 g
S: 40–80 g
SS: 20–40 g The tubers having weights of not less than 20 g, which were produced by the method of the present invention, exhibited production abilities similar to the commercial seed potatoes. Thus, it was proved that the seed potatoes obtained by the method of the present invention are not inferior to the commercial seed potatoes. That is, there were no substantial differences between the seed potatoes produced by the method of the present invention and the commercial seed potatoes in the cultivation characteristics such as sprouting time and flowering time, so that it was shown that the tubers have similar cultivation characteristics to the commercial 3. The method according to claim 1, further comprising the step of giving physical stimulation to said stolons growing on the upper side of said partition member.

4. The method according to claim 3, wherein said step of giving physical stimulation to said stolons is carried out by giving pressure to said stolons.

5. The method according to claim 3, wherein said step of giving physical stimulation to said stolons is carried out by giving shower to said stolons.

6. The method according to claim 1, further comprising the step of cultivating potato plants while immersing bases thereof in nutrient solution which exists up to the level upper than said partition member before forming said potato tubers.

7. The method according to any one of claim 1, wherein a planting plate having planting holes is provided above said partition member, and potato plants are cultivated in the state being inserted in said planting holes.

8. The method according to claim 1, in which potato plants are cultivated wherein bases of said potato plants are placed on the upper side of said partition member.

* * * * *